United States Patent [19]
Mowery et al.

[11] 4,422,422
[45] Dec. 27, 1983

[54] COMBINED CLOSED LOOP AND ANTICIPATING KNOCK LIMITING SPARK TIMING SYSTEM

[75] Inventors: Kenneth D. Mowery, Noblesville; L. Joseph Pechous, Carmel, both of Ind.

[73] Assignee: General Motors Corporation, Detroit, Mich.

[21] Appl. No.: 326,848

[22] Filed: Dec. 3, 1981

[51] Int. Cl.³ .............................................. F02P 5/04
[52] U.S. Cl. .................................................. 123/425
[58] Field of Search ..................... 123/425, 435; 73/35

[56] References Cited
U.S. PATENT DOCUMENTS 4,344,400  8/1982  Asano ............................ 123/435 X
4,357,918  11/1982  Asano ............................ 123/435 X
4,370,963  2/1983  Iwata et al. ......................... 123/425

Primary Examiner—Tony M. Argenbright
Attorney, Agent, or Firm—Robert M. Sigler

[57] ABSTRACT

A closed loop knock control system integrates a knock signal comprising knock intensity indicating knock pulses from an engine mounted knock sensor into a retard voltage in an integrating amplifier normally provided with a fixed reference voltage through a series pair of resistors. The junction of the series pair of resistors is connected through another resistor and a semiconductor switch, when the switch is actuated, to a second constant reference voltage greater in the retard direction than the first. An open loop knock anticipating system responds to a detected knock anticipating event by actuating the semiconductor switch means for a predetermined time duration to produce a step change in the retard direction for the predetermined time duration in the retard voltage and thus in the spark timing. If voltage limiting means is provided in the closed loop system for the output of the integrator, the summed combination of the closed and open loop retard voltages is also limited thereby.

4 Claims, 4 Drawing Figures

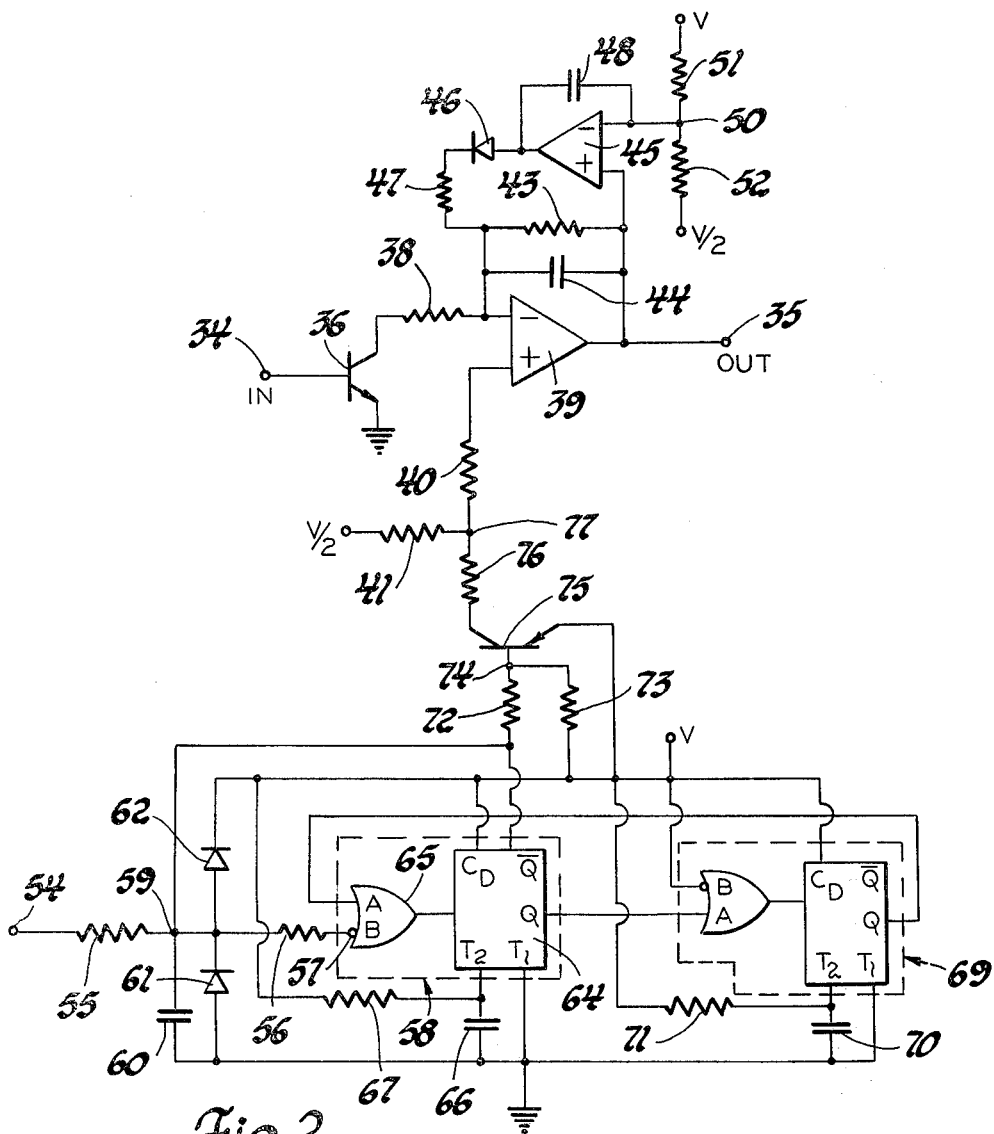
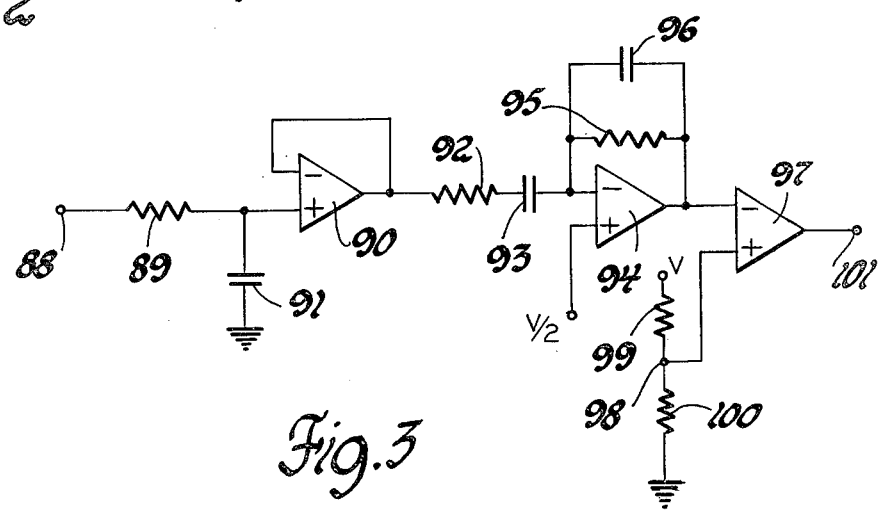
Fig.2
Fig.3

COMBINED CLOSED LOOP AND ANTICIPATING KNOCK LIMITING SPARK TIMING SYSTEM

BACKGROUND OF THE INVENTION

This invention relates to spark timing control systems for spark ignited internal combustion engines and particularly to such systems including both a closed loop knock limiting control in which spark timing is varied in response to the output of an engine mounted knock sensor to limit engine knock and an open loop knock anticipating system in which a short duration knock eliminating retard pulse is generated in response to the detection of a knock anticipating event. In such a system including both closed loop and open loop controls of the same spark timing variable, the designer is faced with the problem of the best way in which to combine the closed loop and open loop signals for the maximum benefit from each system.

In a particular system of interest, signals from an engine mounted knock detector are transformed into a series of constant amplitude, variable duration pulses indicative of knock intensity, which pulses are supplied to an integrating operational amplifier having a fixed reference, the output of which is a knock level indicating voltage which determines the amount of retard introduced to an otherwise predetermined spark timing. The operational amplifier is optionally provided with output voltage limiting means to limit the amount of additional retard to prevent the possibility of crossfire in those engines subject thereto.

An engine subject to knock may also, however, be subject in particular to tip-in knock, which is initiated by a sudden opening of the vehicle throttle resulting in a sudden increase in pressure within the engine air inlet passage and which generates an audible knock or ping of very short duration. The result may be that the tip-in knock causes the closed loop system to vainly provide unnecessarily long spark retard after the knock has already ended. Even if the engine is subject to continued knock after the tip-in knock, however, the initial tip-in knock will still be heard even if the system prevents or limits the subsequent continued knock.

Therefore, it has been proposed to sense an engine tip-in event by the rate of change of a parameter indicative of air pressure in the air inlet passage such as that pressure itself or throttle position and retard spark timing by an amount of crank angle sufficient to prevent the tip-in knock for a period which begins immediately upon the tip-in signal and preferably lasts for a duration no longer that 300 milliseconds from the beginning of the tip-in event. It has been found that such a retard pulse can be put in and removed quickly and is effective to suppress the tip-in knock while not being readily perceived by the vehicle operator in any substantial resulting loss of engine power or vehicle acceleration.

It has been suggested that this tip-in knock eliminating system may be combined with the closed loop system described above in a "highest wins" configuration in which the output voltage of the closed loop knock limiter integrating operational amplifier and a predetermined tip-in retard voltage actuated by a one-shot multivibrator of the proper duration are both connected through diodes to a common input of another operational amplifier so that the greatest of these voltages is passed onto the spark timing system. If the integrating operational amplifier is provided with voltage limiter means, the tip-in retard voltage may be predetermined to be the same voltage limit so that the limit is not surpassed during the tip-in retard. In a case where no such limiter is required, the tip-in retard voltage would be set at some voltage representing a large retard so that there would be some stepped tip-in retard even for a heavily knock limited spark timing. This suggested prior art combination is shown in FIG. 4 of the accompanying drawings and is described in greater detail in the description of the preferred embodiment below.

This approach, however, has two major problems. First, the diodes have forward voltage drops which are temperature sensitive so that the actual retard voltage supplied to the second operational amplifier varies with the ambient temperature of the vehicle. It appears that this variation would be significant and unacceptable. The second objection is that it is not desirable for the tip-in retard to be set at a greater value than is absolutely necessary to prevent the tip-in knock. With an engine where it is set substantially greater than necessary, it may be that the retard will result in some perceptable loss of power in the engine whereas the correct, smaller amount of retard would not. Since the "highest wins" configuration requires a large tip-in retard, this is an undesirable characteristic of this configuration.

It is also preferable not to add the close and open loop signals prior to the integrator, since this would result in the open loop signal being integrated and thus delayed in time, whereas immediate control of the retard is desired in the open loop.

SUMMARY OF THE INVENTION

It is, therefore, an object of this invention to provide a spark timing system including a closed loop knock limiter and open loop knock anticipating and preventing apparatus of the type described above in which the output signals of each are combined in an accurate and optimum manner to control a supplementary retard of spark timing to optimize engine peerformance with respect to knock.

It is another object of this invention to provide such a system which is relatively inexpensive, highly reliable fully adaptable to modern mass production manufacturing techniques.

It is yet another object of this invention to provide such a system wherein, if retard limiting means are required, the combined signal is so limited with respect to retard without additional limiting circuitry.

These objects are met in an additive rather than a "highest wins" system in which the reference voltage supplied to the noninverting or reference input of the integrating amplifier is provided with a step change, in the retard direction, by the tip-in knock eliminating apparatus in amount equal to the retard just necessary to eliminate tip-in knock and coinciding in timing and duration with the tip-in retard pulse. The step change in the reference voltage in the retard direction at the beginning of the pulse and the change in the advance direction at the end of the pulse generate similar changes in the output of the operational amplifier and therefore in the retard controlling voltage, except where limited in amplitude in those systems having voltage limiting means. The closed loop and open loop knock retard signal voltages are thus combined in an additive manner at the proper times and in a way subject to limiting where limiting of the sum is desired. In addition, the retard voltage is not subject to change by temperature sensitive diodes and, where the closed loop system has an output voltage limiter, no additional limiting circuitry is required. Further details and advantages of this invention will be apparent from the accompanying drawings and following dscription of a preferred embodiment.

SUMMARY OF THE DRAWINGS

FIG. 2 shows a circuit diagram of a portion of the system of FIG. 1 showing the combination of the closed loop and open loop knock retard systems.

FIG. 3 shows an additional circuit to be used in the system of FIG. 1 when the knock anticipating apparatus is a throttle position sensor.

DESCRIPTION OF THE PREFERRED EMBODIMENT

Figure 1:
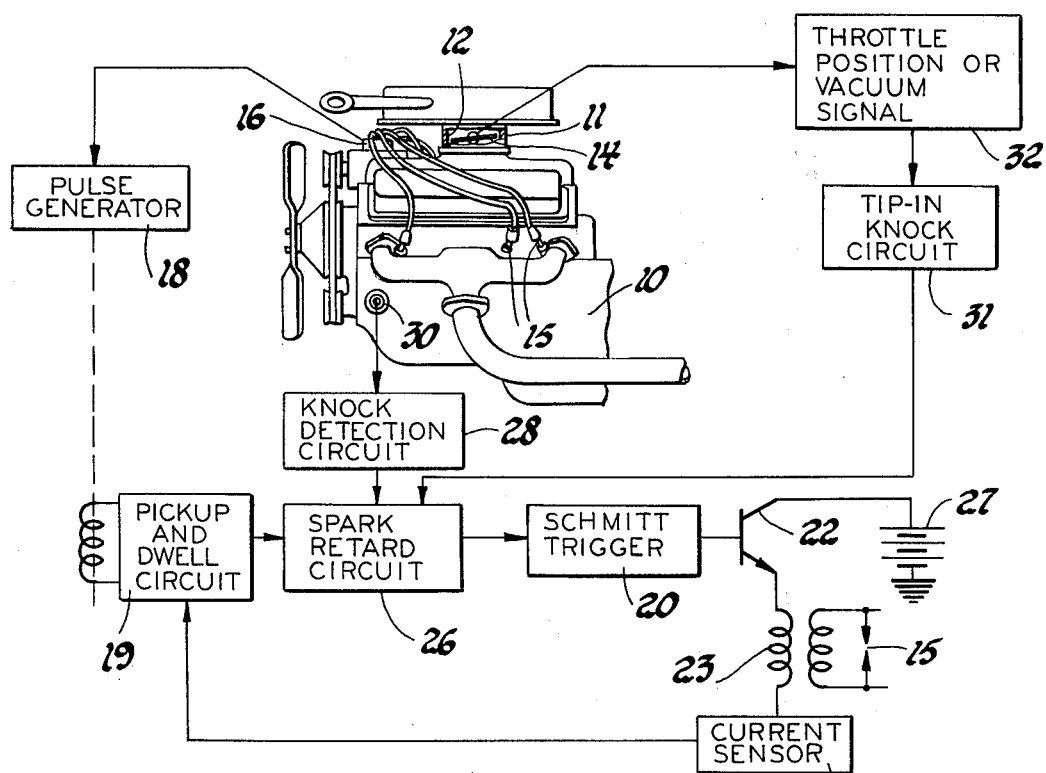
FIG. 1 shows an engine with a spark timing system according to this invention.

FIG. 1 shows a preferred embodiment of this invention. The closed loop portion of the system is substantially the same as the 1980 or 1981 production electronic spark control (ESC) systems available on some vehicles produced by the assignee of this invention. It is also similar to the system described in the U.S. Pat. Nos. to West 4,106,447 and West et al 4,111,035. Therefore, the description of the closed loop knock control portion of FIGS. 1 and 2 will be brief except where they differ from the systems shown in the aforementioned patents.

Referring to FIG. 1, internal combustion engine 10 includes air and fuel supply apparatus of any standard design which includes a carburetor or throttle body 11 defining an air inlet passage 12 including an operator controlled throttle 14. Air flow to the engine 10 is controlled by the vehicle operator through throttle 14; and other apparatus, not shown, provides fuel to combine with the air to form a combustible fuel charge which is delivered to the cylinders of engine 10.

Engine 10 further includes an ignition system including spark plugs 15 effective to ignite the combustible mixture in the cylinders and means including a distributor 16 effective to generate and distribute high voltage pulses for the firing of spark plugs 15. The ignition system further includes a spark timing control in which a pulse generator 18, such as that described in U.S. Pat. No. 3,254,247 to Falgy, generates marker pulses substantially synchronously with engine rotation but with a normal spark timing in crank angle relative to absolute crankshaft rotational position, which timing may be programmed according to engine speed and manifold pressure in the standard manner.

The pulses from pulse generator 18 are provided to circuitry similar to that shown in the U.S. Pat. No. to Richards et al No. 3,828,672, which is summarized in FIG. 1 by pickup and dwell circuit 19, Schmitt trigger 20, switching transistor 22, spark coil 23 and current sensor 24. The pulses from pulse generator 18, which are actually in the form of an AC voltage wave, are squared up in pickup and dwell circuit 19 and then applied to a spark retard circuit 26 such as that shown in the aforementioned West U.S. Pat. No. 4,106,477. The pulses are then passed to Schmitt trigger 20 to switch switching transistor 22 to control the current flow from a DC power source 27 through the primary of spark coil 23 and current sensor 24. The sudden cutoff of current by switching transistor 22 at the end of a pulse causes a high voltage pulse in the secondary of spark coil 23 in the standard manner for application to spark plug 15. Current sensor 24 provides a feedback signal to pickup and dwell circuit 19 to control the dwell time of the pulses for optimum current buildup in the primary of spark coil 23.

A knock detection circuit 28, similar to that shown in the aforementioned West et al U.S. Pat. No. 4,111,035, receives a signal from an engine mounted knock sensor 30 such as that shown in the U.S. Pat. No. to Buck et al 4,161,665 or the U.S. Pat. No. to Keem 4,254,354, and generates a knock control signal which is applied to spark retard circuit 26 to control the amount of retard, if any, given to the spark timing pulses. The signal from knock detection circuit 28 is combined with another knock control signal from a tip-in knock circuit 31 which can provide an additional retard to spark retard circuit 26. Tip-in knock circuit 31 receives a knock anticipating or tip-in signal from tip-in event sensing apparatus 32, which can be, for example, either a throttle position sensor for throttle 14 together with appropriate rate of change sensing circuitry or a differential vacuum or pressure switch sensitive to sudden changes in the pressure within air inlet passage 12. Throttle position sensors of the potentiometer type are well known in the prior art; and FIG. 3 shows a circuit, to be described at a later point in this application, for deriving the rate of change of the output from such a sensor and signalling when it exceeds a reference. Vacuum or pressure differential switches are also well known in the prior art; but care must be taken in their application to this invention. As will be described in more detail at a later point in this application, the response time of such a device must be on the order of 50 milliseconds or less. Therefore, such devices must be designed with small diaphragm and chambers for fast response. It should be apparent to one skilled in the art of such devices how to construct or modify such a device for such a response time constraint. It has been done by employees of the assignee of this invention.

The circuit of FIG. 2 includes the tip-in knock circuit 31 and a portion of knock detection circuit 28 showing the combination of the outputs of that circuit and tip-in knock circuit 31 in this preferred embodiment. Knock detection circuit 28, in response to signals from knock sensor 30, generates a series of pulses indicative of knock induced vibrations, the amplitude of which pulses are constant and the number and duration varying with the intensity of knock. These pulses are provided to an input terminal 34 and are integrated in a fast charge-slow discharge integrator into a knock control voltage provided at an output terminal 35 for application to spark retard circuit 26.

Specifically, input terminal 34 comprises the base of an NPN transistor 36 having a grounded emitter and a collector connected through a resistor 38 to the inverting or integrating input of an operational amplifier or op amp 39. Op amp 39 has a noninverting input connected through series resistors 40 and 41 to a power supply at voltage V/2. It further has an output connected back through a parallel resistor 43 and capacitor 44 to the inverting input and to output terminal 35. Components 38–44 comprise the integrator which has a fast charge rate while transistor 36 is turned on and the input side of capacitor 44 is therefore grounded through resistor 38 and a slow discharge rate when transistor 36 is turned off and capacitor 44 discharges through resistor 43.

Ordinarily, the integrator is provided with a reference voltage V/2 at the noninverting or reference input through resistors 40 and 41.

An op amp 45 has a noninverting input connected to the output of op amp 39 and an output connected through a diode 46 and resistor 47 to the inverting input of op amp 39. It further has an inverting input connected through a feedback capacitor 48 to its output and further to the junction 50 of two series resistors 51 and 52 connected between a power supply at voltage V and the power supply at voltage V/2. These components comprise an upper voltage limiter on the output of the integrator op amp 39. The voltage divider comprising resistors 51 and 52 defines the limit voltage at junction 50; and, if the voltage on the output of op amp 39 attempts to increase above this voltage, op amp 45 conducts to supply the charge current through the resistor 38 and transistor 36 to ground which replaces the current from capacitor 44 to prevent further charging of that capacitor and thus limit the output voltage at output terminal 35. This limiter is somewhat different from that described in the aforementioned West et al No. Pat. No. 4,111,035 in circuitry but performs essentially the same function in preventing the additional retard from retarding the spark timing to the point where crossfire might occur between two different cylinders of engine 10.

A tip-in or knock anticipating signal is provided from apparatus 32 to input terminal 54, which is connected through a resistor 55 and resistor 56 in series to the trigger input 57 of a retriggerable one shot 58. The junction 59 of resistors 55 and 56 is connected through a capacitor 60 and diode 61 in parallel to ground and through another diode 62 to the power supply at voltage V as shown. These diodes and capacitor Retriggerable one shot 58 is commercially available in a package of two; and each unit comprises a one shot portion as shown at 64 and an input OR gate as shown at 65 with a noninverting A input and an inverting B input. In retriggerable one shot 58, the B input is connected to resistor 56, a T1 input is grounded, a T2 input is connected to ground through a capacitor 66 and to power source V through a resistor 67, a CD input is connected to power source V and a not Q output is connected to junction 59. The RC combination of resistor 67 and capacitor 66 determines the period of the one shot and has values chosen to provide a period of 175 to 300 milliseconds in this embodiment (typically 200–250 milliseconds).

Retriggerable one shot 58 also has a Q output which is connected to the A input of a second retriggerable one shot 69. One shot 69 has B and CD inputs connected to power source V, a grounded T1 input, a T2 input connected through a capacitor 70 to ground and a resistor 71 to power source V and a Q output connected back to the A input of one shot 58. The RC combination of capacitor 70 and resistor 71 is set for a period of about 1,000 milliseconds; and the purpose of the second retriggerable one shot 69 is to prevent the retriggering of the first retriggerable one shot 58 from the end of the period of the first one shot 58 to a time 1,000 milliseconds after the beginning of said period to prevent multiple triggers of the system with resulting multiple spark retards from a single tip-in event by signals from a noisy differential vacuum switch. It has been found that such signals may be produced by the switch, since it has contact bounce on both opening and closing, at times after 300 milliseconds from the beginning of the tip-in event but not after 1,000 milliseconds thereafter.

The not Q output of the first retriggerable one shot 58 is connected through a voltage divider comprising series resistors 72 and 73 to electric power source V. The junction 74 of resistor 72 and 73 is connected to the base of a PNP transistor 75 having an emitter connected to power source V and a collector connected through a resistor 76 to junction 77 of resistors 40 and 41.

In operation, the not Q output of retriggerable one shot 58 is ordinarily high, which holds transistor 75 off and isolates the tip-in portion of the circuit from the portion of the circuit included in knock detection circuit 28. Thus, voltage V/2 is provided to the noninverting input of op amp 39 through resistors 40 and 41. When retriggerable one shot 58 is triggered, however, the not Q output goes low and turns on transistor 75 so that the noninverting input of op amp 39 is now connected through resistor 40 to junction 77 and from there through resistor 41 to voltage V/2 and through resistor 76 and transistor 75 to voltage V. The result is an immediate step in the voltage seen by the noninverting input of op amp 39 from voltage V/2 to a predetermined higher voltage between V/2 and V, which causes the output voltage at output terminal 35 to jump by the same voltage, subject to the voltage limitation determined by the voltage at junction 50. The increase in voltage seen at the non-inverting input of op amp 39 is set by the selection of resistors 40, 41 and 76 to be that required to produce the desired supplemental retard (typically between 10 and 25 degrees crankshaft rotation) sufficient to prevent the occurrence of the tip-in knock. When the period of retriggerable one shot 58 ends, the not Q input again goes high and the system reverts in another step change to its previous state with the original output voltage at output terminal 35. Retriggerable one shot 69 continues to prevent retriggering of one shot 58 for the full 1,000 millisecond period from its initial trigger.

Figure 4:
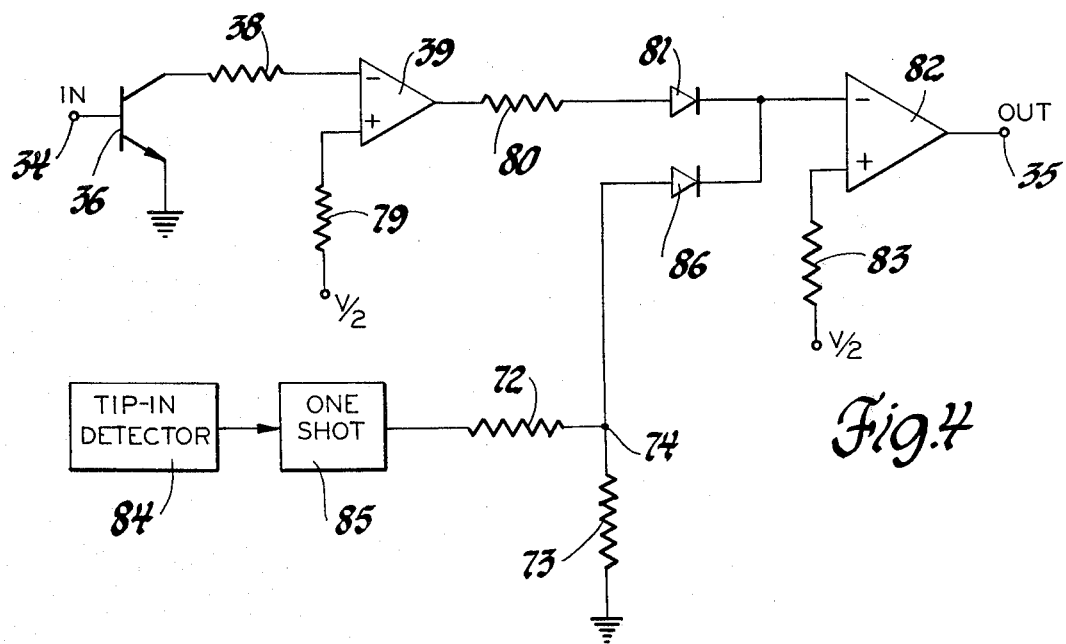
FIG. 4 shows the aforementioned suggested combination of closed loop and open loop knock control systems over which this invention is an improvement.

The advantage of the method of interconnection of the tip-in and closed loop knock circuits as shown in FIG. 2 can be seen with reference to the circuit of FIG. 4. The circuit of FIG. 4 includes input terminal 34, transistor 36, resistor 38 and op amp 39, which are identical to those elements in the circuit of FIG. 2. The feedback and limiter elements associated with op amp 39 are not shown but are understood to be included. Resistor 79 of FIG. 4 is equal to the series combination of resistors 40 and 41 in FIG. 2. The output of op amp 39 is connected through a resistor 80 and diode 81 to the inverting input of an op amp 82 having a noninverting input connected through a resistor 83 to power supply V/2 and an output comprising output terminal 35. A tip-in detector 84 corresponds to apparatus 32; and it triggers a one shot 85, which corresponds to elements 54–71 of FIG. 2. Resistors 72 and 73 with junction 74 correspond to the like numbered elements of FIG. 2; but in FIG. 4 they are connected between the (not Q) output of one shot 85 and ground. Junction 74 is connected through a diode 86 to the inverting input of op amp 82.

In FIG. 4, the closed loop and tip-in knock retard outputs are connected through diodes 81 and 86 to amplifier 82 in a "highest wins" configuration. Op amp 39 is understood to have the voltage limiting apparatus of FIG. 2. Since some additional retard is desired from the tip-in circuit even when the closed loop knock retard is substantial, the tip-in retard voltage at junction 74 determined by resistor 72 and 73 is set to the maximum limiting voltage of the closed loop system. Even if there is no limiter, however, this voltage will be set for a large retard so that there will almost always be some step retard upon tip-in.

There are, however, two problems with this configuration. The first is that the temperature dependence of the voltage across diodes 81 and 86, while perhaps of no great consequence in a constant temperature laboratory environment, is too great for the extremes of ambient temperature in a real world automobile environment. Variation in the voltage across diodes 81 or 86 would produce a variation in the retard. The other objection is that the retard required by some engines to prevent tip-in knock is substantially less than the maximum retard corresponding to the voltage at junction 74 and the limit of the voltage at the output of op amp 39. With such engines, if the greater retard limit voltage is used when there is little or no retard from the closed loop system, there may be a very slightly perceptable loss of power due to the extra and unnecessary retard triggered by the tip-in circuit. It is thus desirable to provide no greater retard step change than required for a particular engine to eliminate the tip-in knock; and this is impractical with the circuit of FIG. 4. However, the circuit of FIG. 2 has neither of these objections, since it does not include the diodes 81 and 86 and is an additive retard circuit wherein the retard due to the tip-in circuit need not be any greater than necessary and yet the sum of that retard plus the retard of the closed loop circuit may still be limited by the closed loop system limiter to prevent crossfire. Thus the closed and open loop circuits are combined in a unique manner providing operational advantages and minimal extra cost.

The circuit of FIG. 3 is used with a throttle position potentiometer to sense the rate of increase of throttle opening and generate an output signal when that rate exceeds a predetermined reference. An input terminal 88 is connected through a resistor 89 to the noninverting input of an op amp 90 and also through resistor 89 and a capacitor 91 in series to ground. Op amp 90 has an output connected to its inverting input and also through a resistor 92 and capacitor 93 in series to the inverting input of an op amp 94. Op amp 94 has a noninverting input connected to power supply V/2 and an output connected back to the inverting input through a parallel combination of resistor 95 and capacitor 96 and further to the inverting input of a comparator 97. Comparator 97 has a noninverting input connected to the junction 98 of a pair of resistors 99 and 100 connected between power supply V and ground and an output connected to an output terminal 101.

In the circuit of FIG. 3, input terminal 88 is connected to receive the output of the throttle position sensor; and the combination of resistor 89 and capacitor 91 forms a noise reducing low pass filter. Op amp 90 is a voltage follower buffer which is connected through the differentiating circuit of resistor 92 and capacitor 93 to op amp 94. The output of op amp 94, which represents the derivative of the input signal and therefore the rate of change of throttle position, is compared with a reference determined at junction 98 by resistors 99 and 100 and causes a change in output of comparator 97 only when it exceeds that reference in the positive direction.

It should further be clear from the foregoing description that, if it is desired that the retard vs. time configuration for the open loop response of the system be different from that shown herein, the system is still operative and advantageous.

For example, it may be desirable, with an engine extremely susceptible to knock, to "blend" the open and closed loop responses by returning gradually, rather than in a step, from the open loop retard after the 175–300 millisecond period. If a pulse generator with such an output is used in place of the one shown herein, the desired shape of retard over time from said pulse generator will be faithfully passed through, subject only to retard amplitude limiting.

Selected component values for the circuit of FIG. 2 are as follows:

--- one shots 58, 59 - 14538
op amps 39, 45 - LM2902
transistor 36 - 2N4401
capacitor 48 - 22
capacitor 44 - 4.7 µF
capacitor 60 - .01 µF
capacitor 66, 70 - 2.7 µF TAN
resistor 55 - 1 K
resistor 56 - 47 K
resistor 67 - 75.0 K, 1%
resistor 51 - 29.4 K, 1%
resistor 52 - 20 K, 1%
resistor 47 - 470
resistor 43 - 487 K
resistor 38 - 22 K
resistor 40 - 475 K, 1%
resistor 41 - 13.3 K, 1%
resistor 76 - 37.4 K, 1%
resistor 72 - 20 K
resistor 73 - 10 K
resistor 71 - 374 K, 1%

---

The embodiments of the invention in which an exclusive property or privilege is claimed are defined as follows:

1. A knock limiting spark timing system for an internal combustion engine subject to knock-induced vibrations and having means effective to generate spark events with a predetermined timing relative to crankshaft rotational position and further having means effective to selectively retard spark timing from the predetermined spark timing by a retard angle determined by a retard voltage, the system comprising in combination:
  means effective to sense the knock-induced vibrations and generate a knock signal therefrom comprising voltage pulses indicative of knock intensity;
  integrator means effective to generate the retard voltage from said knock signal, the integrator means having an integrating input adapted to receive the knock signal and a reference input normally provided with a constant predetermined reference voltage;
  means responsive to a detected engine knock anticipating event to generate a step change, in the retard direction, to the voltage provided to the reference input of the integrator, whereby a similar step change in the retard direction is produced in the retard voltage and thus in the engine spark timing, whereby open and closed loop knock control signals are combined in an additive manner to form a single retard voltage.

2. A knock limiting spark timing system for an internal combustion engine subject to knock-induced vibrations and having means effective to generate spark events with a predetermined timing relative to crankshaft rotational position and further having means effective to selectively retard spark timing from the predetermined spark timing by a retard angle determined by a retard voltage, the system comprising, in combination:

means effective to sense the knock-induced vibrations and generate a knock signal therefrom comprising voltage pulses indicative of knock intensity;

integrator means effective to generate the retard voltage from said knock signal, the integrator means comprising an operational amplifier having capacitive feedback to an inverting input adapted to receive the knock signal, a noninverting input normally provided with a constant predetermined reference voltage, and retard limit circuit means effective to limit the output voltage of the operational amplifier and thus the magnitude of the retard;

means responsive to a detected engine knock anticipating event to generate a step change, in the retard direction, to the voltage provided to the noninverting input of the operational amplifier, whereby a proportional stepped retard, subject to limiting by the retard limit circuit means, is produced in the engine spark timing; and means responsive to the event after a predetermined time duration to restore the predetermined reference voltage to the noninverting input of the operational amplifier, whereby open and closed loop knock control signals are combined to form a single retard voltage subject to retard limiting.

3. A knock limiting spark timing system for an internal combustion engine subject to knock-induced vibrations and having means effective to generate spark events with a predetermined timing relative to crankshaft rotational position and further having means effective to selectively retard spark timing from the predetermined spark timing by a retard angle determined by a retard voltage, the system comprising, in combination:

means effective to sense the knock-induced vibrations and generate a knock signal therefrom comprising voltage pulses indicative of knock intensity;

integrator means effective to generate the retard voltage from said knock signal, the integrator means comprising an operational amplifier having capacitive feedback to an inverting input adapted to receive the knock signal and a noninverting input connected through a series pair of resistors to a first constant predetermined reference voltage;

semiconductor switch means effective, when actuated, to connect the junction of the pair of series resistors through another resistor to a second constant predetermined reference voltage greater in the retard direction than the first, whereby actuation of the semiconductor switch means provides a step change, in the retard direction, in the retard voltage and thus in spark timing;

means responsive to a detected engine knock anticipating event to actuate the semiconductor switch for a predetermined time duration, whereby open and closed loop knock signals are combined in an additive manner to form a single retard voltage responsive to the knock signal and the knock anticipating event.

4. A knock limiting spark timing system according to claim 3 further comprising voltage limiter means effective to limit the retard voltage to prevent crossfire.

* * * * *

UNITED STATES PATENT AND TRADEMARK OFFICE
CERTIFICATE OF CORRECTION

PATENT NO. : 4,422,422
DATED : December 27, 1983
INVENTOR(S) : Kenneth D. Mowery; Joseph Pechous It is certified that error appears in the above—identified patent and that said Letters Patent is hereby corrected as shown below:

Column 2, line 27, "close" should read -- closed --.

Column 5, line 36, after "capacitor" insert

-- 60 provide input transient protection for one shot 58. --.

Signed and Sealed this

Seventeenth Day of April 1984

[SEAL]

Attest:

GERALD J. MOSSINGHOFF

Attesting Officer     Commissioner of Patents and Trademarks